United States Patent [19]

Celorio Mendoza

[11] Patent Number: 4,979,438
[45] Date of Patent: Dec. 25, 1990

[54] APPARATUS FOR GRINDING AND PRECOOKING GRAIN

[76] Inventor: Fausto Celorio Mendoza, Calzada San Esteban, Num 57, Naucalpan de Juarez, Mexico

[21] Appl. No.: 441,824

[22] Filed: Nov. 27, 1989

[51] Int. Cl.$^5$ .......................... A23L 1/34; A23P 1/00; B02B 5/00
[52] U.S. Cl. ........................................ 99/353; 99/352; 99/357; 99/483; 241/65
[58] Field of Search ................. 99/339, 352, 353, 357, 99/426, 467, 471, 473, 483, 484, 510, 516; 241/65–67; 165/86; 426/262, 473, 518, 523

[56] References Cited

U.S. PATENT DOCUMENTS

| | | | |
|---|---|---|---|
| 2,389,816 | 11/1945 | Richardson | 241/66 X |
| 2,587,372 | 2/1952 | Oliver | 241/98 X |
| 2,873,663 | 2/1959 | Hawk et al. | 241/65 |
| 3,935,808 | 2/1976 | Mendoza | 99/353 |
| 3,948,449 | 4/1976 | Logan et al. | 241/65 X |
| 4,222,527 | 9/1980 | Davis | 241/65 |
| 4,250,802 | 2/1981 | Rubio | 99/353 |
| 4,463,022 | 7/1984 | Sterner et al. | 426/262 |

*Primary Examiner*—Timothy F. Simone
*Attorney, Agent, or Firm*—Jeffers, Hoffman and Niewyk

[57] ABSTRACT

An apparatus for grinding and precooking grain includes a housing that contains grinding disks, a hopper for input of the grain, a worm screw, and an output tube for the flour, wherein the housing defines a hermetic chamber inside which the vapor produced by friction while grinding is accumulated. A tube is provided from the hermetic chamber to capture the vapors and lead them to the tube through which the grain enters in order to precook it. The grinding disks have an alternating disposition of channels and reliefs in order to capture the vapor and lead it to the center of the disk through which the grain enters and return it to the input tube communicating with the hopper through the worm screw.

3 Claims, 5 Drawing Sheets

APPARATUS FOR GRINDING AND PRECOOKING GRAIN

BACKGROUND OF THE INVENTION

The present invention relates generally to an apparatus for grinding grain into flour, and more particularly to such an apparatus in which the vapor generated by friction during grinding of the grain passes over the incoming grain to precook it.

In other inventions by the same applicant, the utilization of the heat produced by friction while grinding such grains as wheat, corn (maize), soybeans, beans, rice, lentils, etc. to cook the grain and turn it into cooked flour, has already been disclosed.

It would be advantageous to introduce further improvements to the prior art to enhance the grinding and cooking of the grain during grinding.

SUMMARY OF THE INVENTION

The present invention involves an apparatus that comprises a housing for the grinders, a hopper for grain input, an input tube for transport of the grain from the hopper, a worm screw to convey the grain to the grinding disks, an output for flour and a duct leading from the grinding chamber to the grain input tube in order to capture the vapor produced by friction and put it into contact with the grain that is coming in, in order to soften and precook it.

It is an objective of the present invention to introduce improvements that will allow optimal utilization of the vapor generated by friction while grinding the grains.

Another objective of the invention is to provide grinding disks with a special grooving that alternates zones in relief with diagonal and circular channels that help to capture and lead the vapor so that it will be more in contact with the grain, both whole and crushed.

These and other characteristics and objectives of the invention will be more amply described jointly with the attached drawings.

DESCRIPTION OF THE PREFERRED EMBODIMENT

Figure 1:
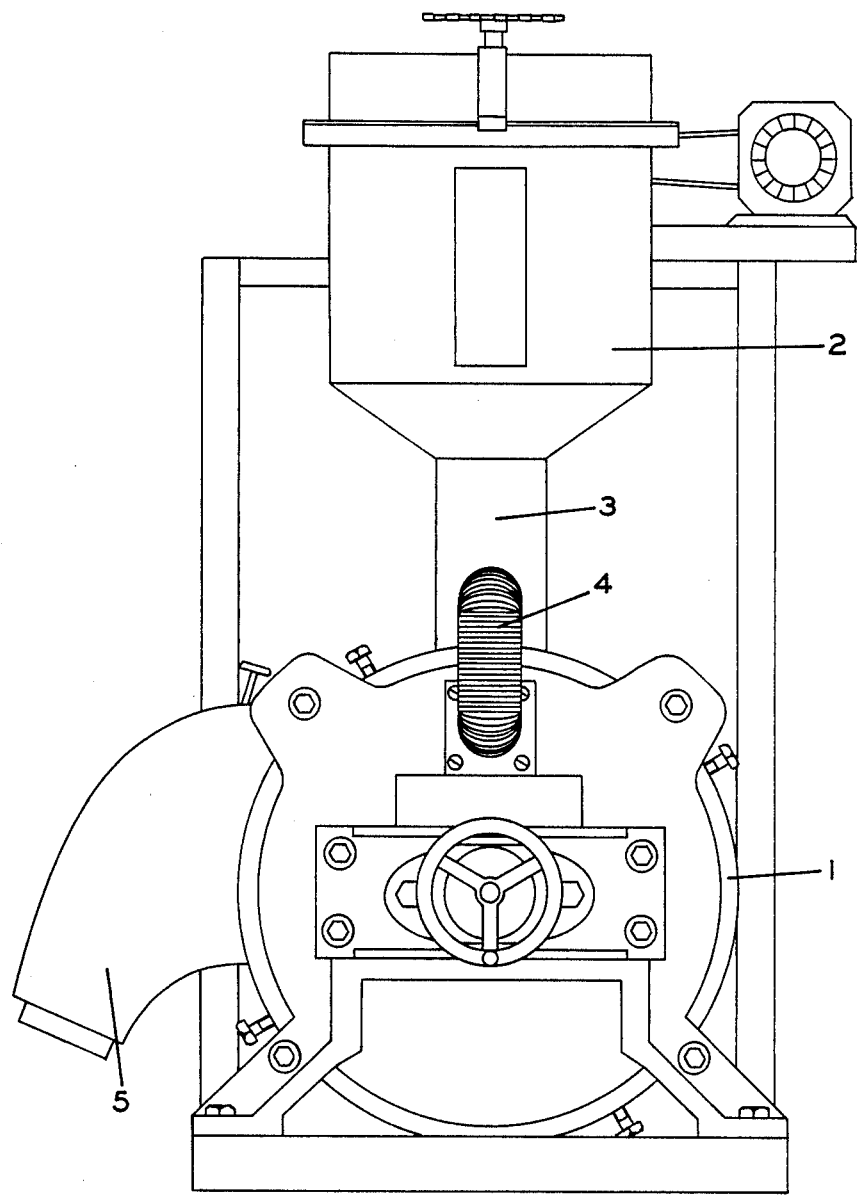
FIG. 1 is a side view of an apparatus for grinding and precooking grains in accordance with the present invention.
Figure 2:
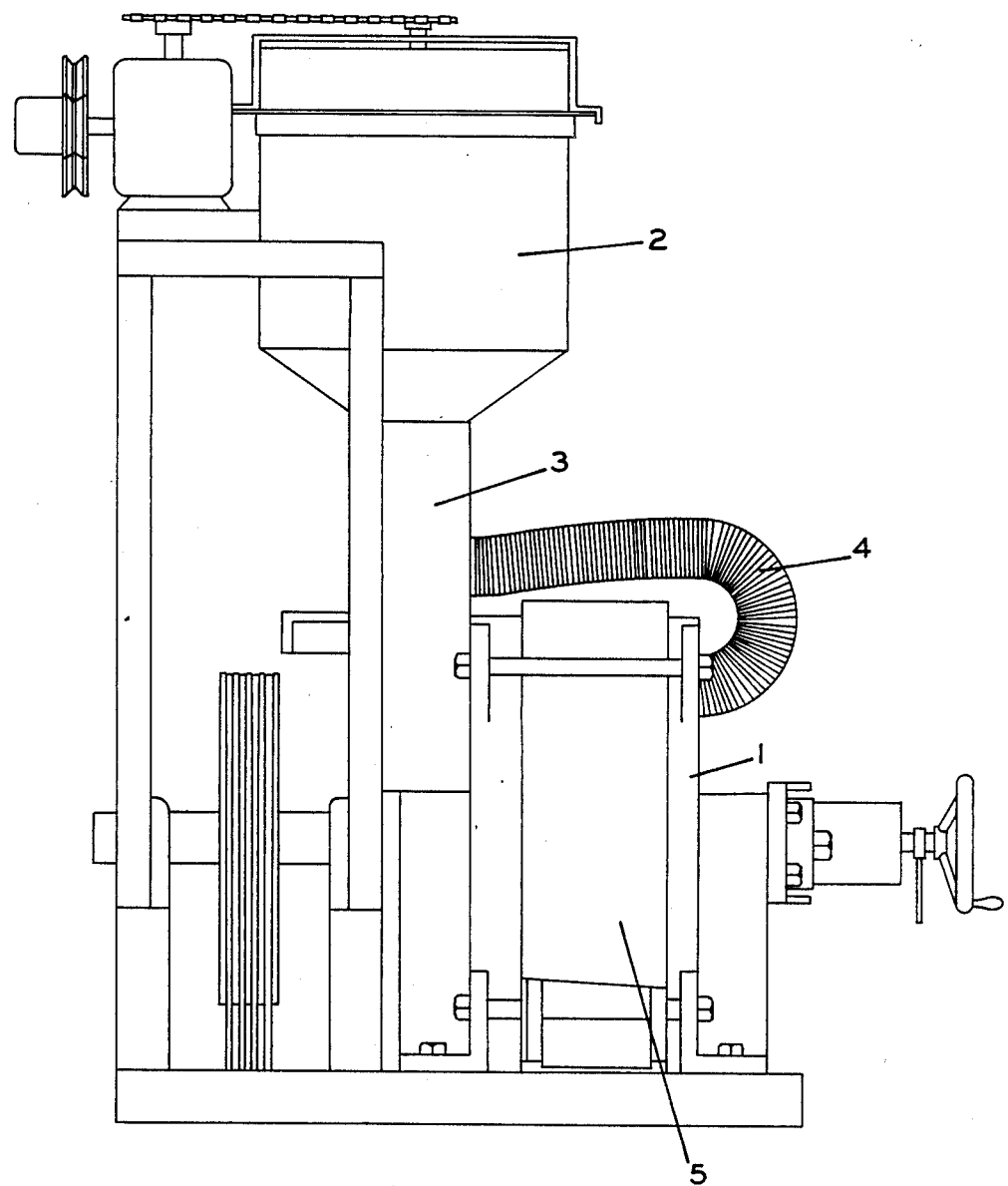
FIG. 2 is a front view of the apparatus of FIG. 1.
Figure 3:
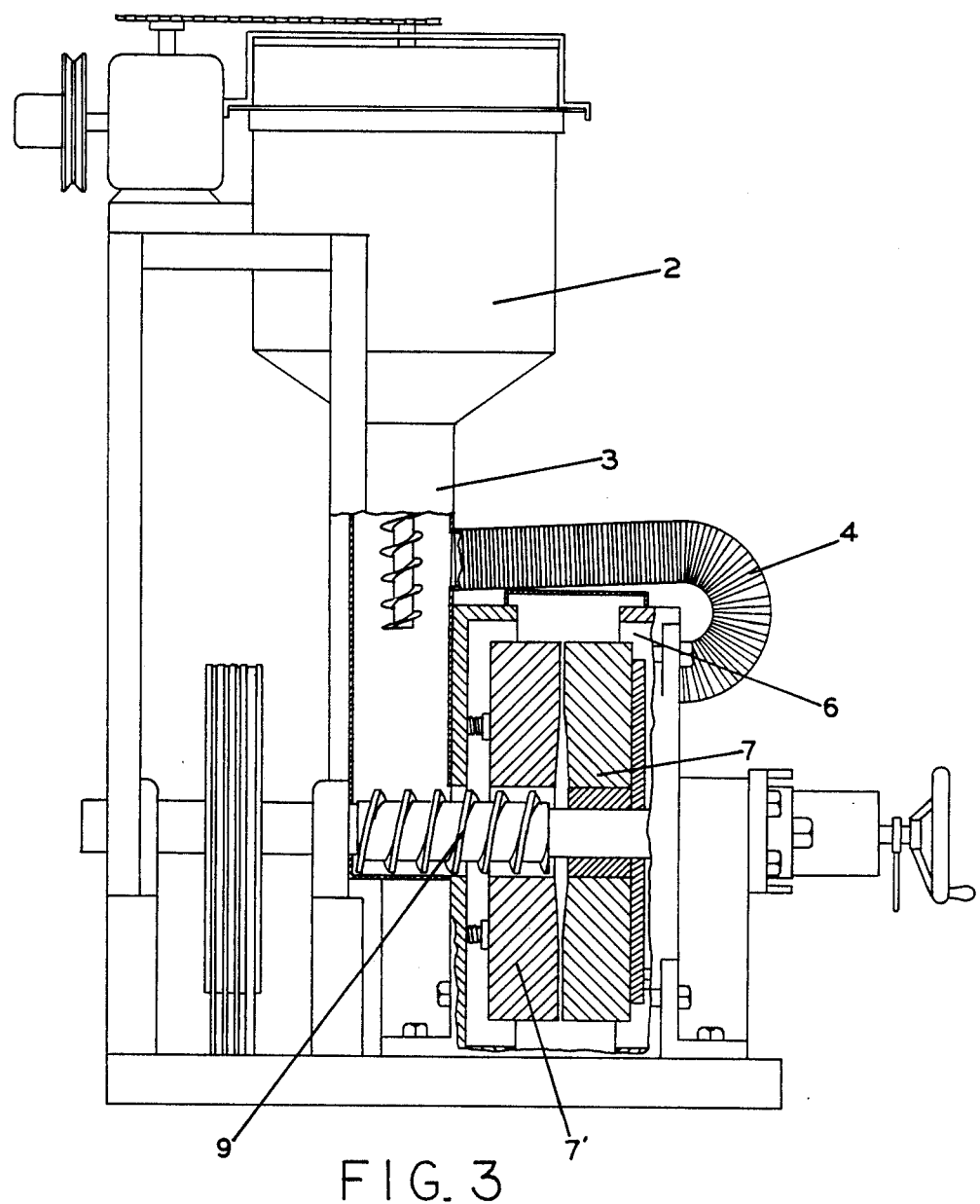
FIG. 3 is a sectional view of the apparatus of FIG. 1 as viewed in FIG. 2.
Figure 4:
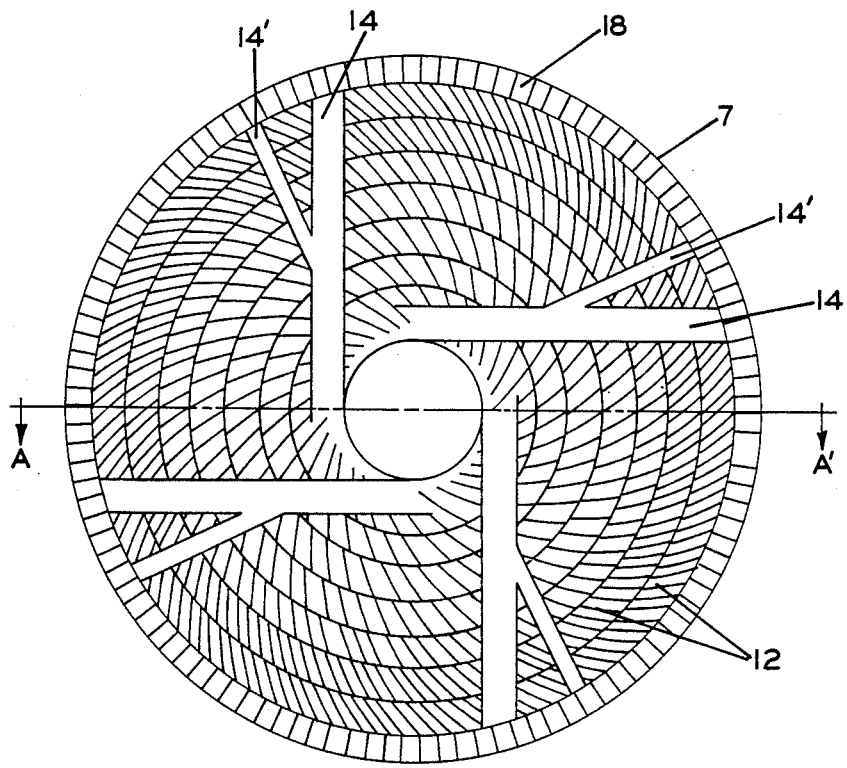
FIG. 4 is a top view of a grinding disk according to the invention and used in the apparatus of FIG. 1.
Figure 5:
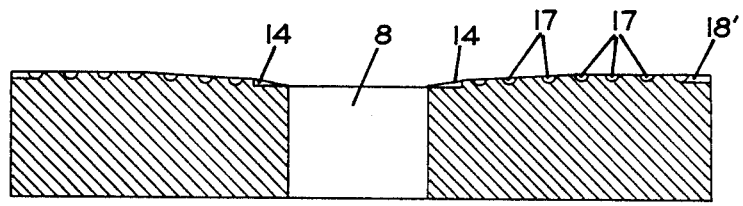
FIG. 5 is a sectional view of the disk of FIG. 4.
Figure 6:
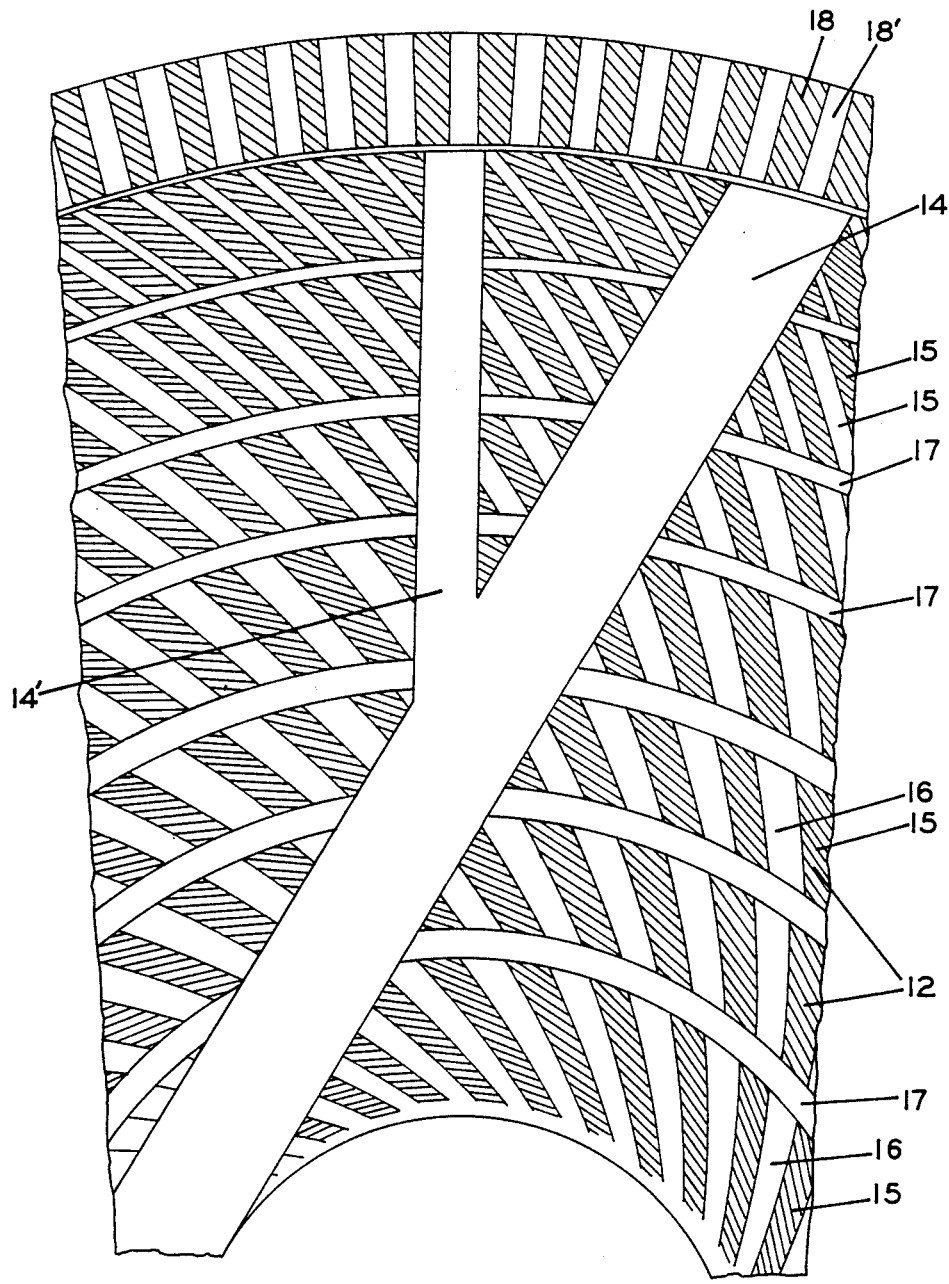
FIG. 6 is an enlarged view of a section of the grinding disk of FIG. 4.

Referring particularly to FIGS. 1-3, a preferred embodiment of an apparatus in accordance with the present invention includes a housing 1, the inside of which defines a hermetic chamber 6 where the grinding disks 7, 7' are situated. A hopper 2 that is continued by tube 3 introduces the grain which is then conveyed by worm screw 9 to the disks 7, 7'. A duct 4 placed between chamber 6 and tube 3 captures the vapor generated by friction and puts it into contact with the grain that is coming in. Through worm screw 9, vapor also escapes and passes on to the lower part of tube 3. The cooked flour exits through spout 5 (FIG. 1). Disks 7, 7' (FIGS. 4-6) have a plurality of concentric circular zones 12 and a hollow central portion 8 through which the corn or grain enters. In addition, four wider channels 14 extend from the center 8 to the edge 18 of the disk. Each channel 14 has a smaller branch 14'. Circular zones 12 have projections or sections in relief 15 alternating with channels 16 which are oriented diagonally with respect to a radius of the disk. Other circular distributor channels 17 divide the different grinding zones circularly. The diagonal channels 16 as well as the circular channels 17 become narrower as they approach the edge of the disk, which comprises a circular zone 18 that has channels 18' radially oriented.

In operation of the apparatus, the grain enters through tube 3 and passes through central portion 8 to channels 16 and is compelled by the disk's rotary movement to go to the grinding elements 15; from there, it is ground and at the same time moves on until it reaches the circular distributor channel 17, with as many cycles being repeated as there are circular zones and distributor channels. Channels 14 capture the vapor produced by friction while grinding and returns it to the center 8 of disk 7 from whence it passes through worm screw 9 to tube 3 through which the grain enters, whereby the grain is precooked. Likewise, the vapor escaping over the edge zone 18 passes from chamber 6 to duct 4 and from thence to tube 3 also. The channels become ever smaller or narrower in the direction toward the edge of the disk in order to carry ever smaller particles as the grain is ground.

With this arrangement of the profiles, reliefs and grooves and the combination of ducts to return the vapor, perfect grinding and cooling of the grain is obtained as maximum utilization is made of the heat produced by grinding friction.

While the present invention has been particularly described in the context of a preferred embodiment, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which fall within the appended claims or the equivalents thereof.

What is claimed is:

1. Apparatus for grinding and precooking grain, said apparatus comprising:
   a housing delimiting a hermetic chamber in which vapor produced by friction while grinding is accumulated;
   grinding disks disposed within the hermetic chamber of said housing for grinding grain;
   a hopper for input of grain;
   an input tube communicating with said hopper for transport of said grain from said hopper;
   a worm screw in communication with said input tube and said hermetic chamber for conveying grain from said input tube to said grinding disks;
   an outlet communicating with the hermetic chamber for exit of flour produced by grinding of grain by said grinding disks; and
   a tube communicating with the hermetic chamber and said input tube for passage of the vapor from said hermetic chamber to said input tube to precook grain therein;

said grinding disks having alternated channels and reliefs arranged to capture and carry the vapor centrally with respect to the disk to said worm screw, through which worm screw the vapor is returned to the input tube to precook grain therein.

2. The apparatus of claim 1, in which each of said grinding disks includes a plurality of concentric circular zones in which channels and reliefs are alternated and arranged diagonally with respect to a radius of the disk, the concentric circular zones being separated by circular channels, and further including a plurality of larger channels arranged from center to edge of the disk, each larger channel being provided with a smaller branch channel, whereby vapor produced by friction is concentrated in the channels and passed to the center of the disk.

3. The apparatus of claim 2, in which the diagonal and circular channels are increasingly narrower in the direction toward the edge of the disk.

* * * * *